(No Model.)
J. S. DIGNAM.
MODE OF DECORATING GLASSWARE.
No. 293,639.  Patented Feb. 19, 1884.
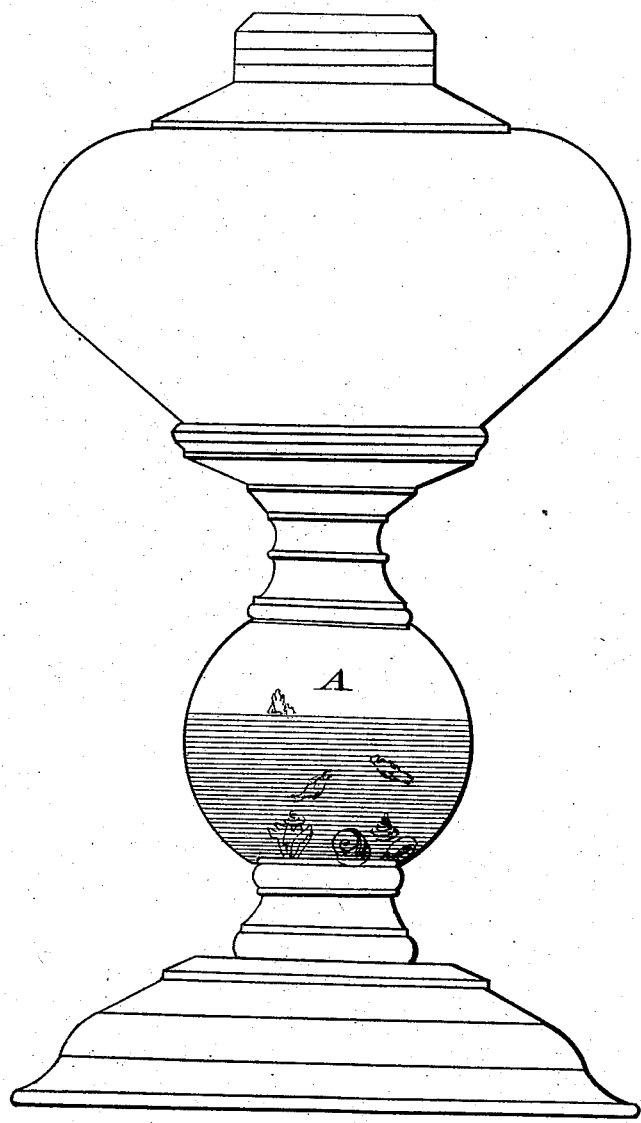
Witnesses:
Gilbert Glass
N. S. Williams
Inventor:
John Sifton Dignam

UNITED STATES PATENT OFFICE.

JOHN SIFTON DIGNAM, OF LONDON, ONTARIO, CANADA.

MODE OF DECORATING GLASSWARE.

SPECIFICATION forming part of Letters Patent No. 293,639, dated February 19, 1884.

Application filed June 1, 1883. (No model.)

*To all whom it may concern:*

Be it known that I, JOHN SIFTON DIGNAM, a subject of Her Majesty Queen Victoria, residing in the city of London, county of Middlesex, Province of Ontario, Dominion of Canada, have made a new and useful invention in the Mode of Decorating the Hollow Parts of Glassware, the name whereof is "Dignam's Aquarium Decoration;" and I hereby declare that the said invention has not been patented to me or to others with my consent or knowledge in any country, and that according to my knowledge or belief the same has not been in public use or on sale in the United States for more than two years prior to the application in this country; and I do further hereby declare that the following is a full, clear, and exact description of the said invention, which will enable others skilled in the art to which it appertains to make the same.

The invention relates to a new method of decorating the hollow stems, cover-knobs, or other convenient parts of lamps, fruit-dishes, salvers, and other articles composed of glass, in representation of an aquarium; and it consists in placing in the part to be decorated a transparent non-congealing fluid and placing therein models representing aquatic animals, natural sea-shells, artificial aquatic plants and flowers, rocks, and other suitable articles, all the articles used in said decoration to be on a small scale, as the combination of the glass and liquid will magnify them to from three to five times their real size, and thus greatly add to the beauty of the decoration; also, all the artificial articles are to be composed of substances that will float on top or sink below the surface, or sink to the bottom, in accordance with the habits of the animals, plants, or flowers that they represent. The motion in moving the article, when in use, will disturb the liquid and cause the animals to move around on top or through the liquid in a natural manner.

In the drawing, in order to fully explain the meaning, a complete lamp is shown; but A is the only part of it to which my application for a patent refers. Either of the necks connecting A with the other parts of the lamp would be hollow, and thus form a passage, through which the liquid, models, &c., as I have described them, could be put into A, after which the opening could be closed in a tight and proper manner.

Although a particular article is shown in the drawing, I do not wish to limit myself to the same; but

What I claim as my invention is—

The mode of decorating the hollow stems and cover-knobs of articles made of glass in representation of an aquarium, substantially as and in the manner hereinbefore described.

JOHN SIFTON DIGNAM.

Witnesses:
GILBERT GLASS,
N. S. WILLIAMS.